United States Patent [19]
Nysten

[11] 3,746,237
[45] July 17, 1973

[54] DEVICE FOR THE CONNECTION OF SNAP FASTENER CLOSURE HALVES OVER A SECURING RING HAVING BENDABLE PRONGS ON A CARRIER

[75] Inventor: Bernhard Nysten, Aachen, Germany

[73] Assignee: Firma William Prym-Werke K.G., Stolberg/Rhineland, Germany

[22] Filed: July 16, 1971

[21] Appl. No.: 163,149

[30] Foreign Application Priority Data
July 17, 1970 Germany................. G 70 26 930.6

[52] U.S. Cl. ............................................. 227/147
[51] Int. Cl. ............................................. B25c 7/00
[58] Field of Search.................... 29/243.52, 243.53, 29/283, 432.2; 24/245 DA, 255 SL, 156 R; 227/144, 145, 147

[56] References Cited
UNITED STATES PATENTS
1,428,498  9/1922  Telli.................................. 227/145
3,250,450  5/1966  Le Page............................. 227/144
3,472,442  10/1969  Handwerger...................... 227/147
3,496,614  2/1970  McGarry........................... 24/156 R

*Primary Examiner*—Robert C. Riordon
*Assistant Examiner*—J. C. Peters
*Attorney*—Ernest G. Montague

[57] ABSTRACT

A device for the connection of snap fastener closure halves, as a snap fastener matrix or a snap fastener patrix by a securing ring having flexible prongs, by means of an impact tool on a carrier. The carrier comprises two hinge-like connected holdable plates, which in alignment towards each other having receivers for the snap fastener closure halves and for the securing ring. Both plates are integrally formed of synthetic material and are connected by a flexible bridge of material.

9 Claims, 7 Drawing Figures

Patented July 17, 1973 3,746,237
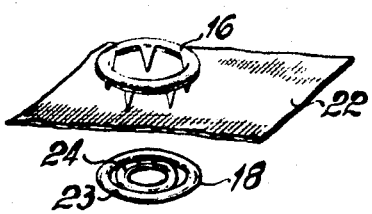
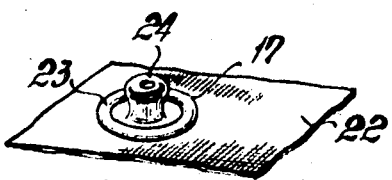
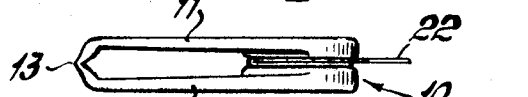
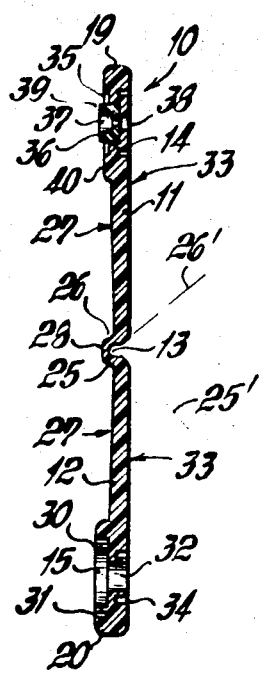
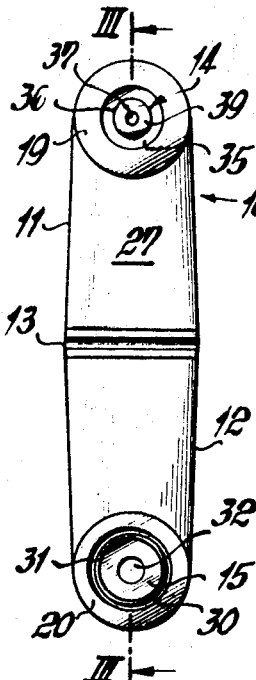
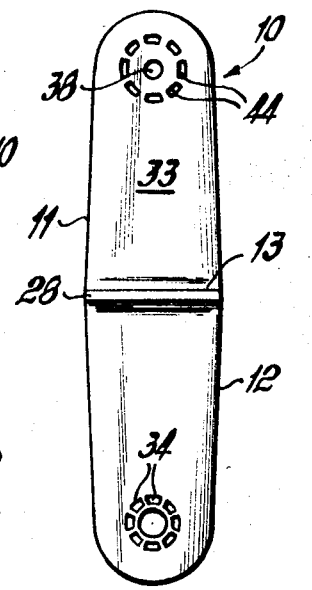

DEVICE FOR THE CONNECTION OF SNAP FASTENER CLOSURE HALVES OVER A SECURING RING HAVING BENDABLE PRONGS ON A CARRIER

The present invention relates to a device for the connection of snap fasteners closing halves, as snap fastener patrixes or matrixes on a carrier, whereby suitably as a securing element a securing ring is used with prongs, which can be bent over. The device comprises two hinge-like connected foldable plates, which have in alignment to each other receivers for the snap fastener halves, on the one hand, and the securing rings, on the other hand. The two plates can be pressed, after folding, towards each other by means of an impact tool, in particular by means of a hammer, whereby a connection between the fastener bodies, the snap fastener closing halves and the carriers is brought about.

It is one object of the present invention to provide a device for the connection of snap fastener closing halves over a securing ring on a carrier, which securing ring has prongs which can be bent over, in which a possibly simplest, money saving and non-objectionable functioning device is developed, whereby it is proposed, to produce the two plates integrally of synthetic material and to connect together the same by a bridge of a flexible material. This device can be produced in one working step in an injection molding process and assures a non-objectionable alignment of the two receptions in the collapsed state. The flexible material bridge between the two plates assures furthermore, that in the non-tensioned state the two plates are maintained relative to each other in a stretched position and thus can easily be applied with a snap fastener closing half, on the one hand, and the securing ring, on the other hand. Suitably the flexible working material bridge is formed elastically, which provides by itself that the stretch speed of the two plates is present in the non-tensionsed state.

For this purpose, in particular, however, in order to obtain a non-objectionable parallel position of the two plates in the folded state during performing of the connection, it is advisable, to provide a U-shaped profile for the working material bridge in the completely stretched position, the arm ends of which are mounted on the plate faces. Furthermore, it is of importance for a non-objectionable function of the device to provide in the head range of the U-profile of the working material bridge a weakened point, which serves as bending zone of the working material bridge. This weakening can be formed in different manners. It is advisable to form the weakening as thinning of the working material. It would however, be possible to provide the weakening of the working material to bring about by perforations or notches.

It is particularly of advantage, to extend the arms of the U-profile of obtuse-angled to the plate plane. The arm ends sit thereby advantageously on the inner face of the plates, which have the receptions for the snap fastener closing halves and the securing ring.

For reasons of simplicity and function safety, it is advisable to provide on the one plate a single, combined receiver for the selective arrangement of a snap fastener patrix and snap fastener matrix, which has a holder formed elastically and surrounding the edge of the snap fastener flange. In the center of the holder is provided a bore for the reception of the snap fastener top faces set off from the flange, as the mushroom-like top faces of the patrix. In a particularly advantageous manner, the holder is formed of an annular collar, which is adjusted to the plate of the device and is formed corresponding with the flange diameter of the snap fastener as to its width. In order to obtain an over pressure safety during the hitting process for performance of the connection, it is advisable to surround the annular collar by a massive annular reinforcement, which is separated from the collar by an annular split. The annular split provides a yielding of the collar and its form elasticity. The massive annular reinforcement assures, that the annular collar is not taken up by non-permissible high forces in the hitting performance by a hammer. Simultaneously the annular reinforcement takes care for a further stiffness of the plate.

The other plate serving the reception of the securing ring carries a core, the core width of which is adjusted to the inner space of the securing ring. Along the outer periphery of the core piece there is arranged narrowly a foot member of the prongs of the securing ring, while the prong ends project beyond the upper end face of the core piece. Due to the narrow passage between the foot members of the prongs and the core piece the holding effect is exerted in a sufficient degree to be the securing ring. It is advisable to form a core piece of soft elastic synthetic material and to produce the same separately from another pair of plates consisting of synthetic material, which device is made of polypropylene or polyethylene. In order to produce a holding effect to a sufficient degree, the core piece should project with its end face over the top of an annular reinforcement, which extends about the securing ring, when the latter is inserted into the reception of the plate. The soft elastic synthetic material will deform itself during the impact application without loosing its original form, so that a multiple use of the tool of connecting processes of snap fasteners on carriers is assured. By the extending core piece beyond the reinforcement simultaneously the bending process of the prongs is enhanced, because the latter bent outwardly during upsetting of the core piece and can obtain their final bending process in the corresponding form recesses of the closed device.

It is advisable to arrange annularly recesses, on the outside of the two plates in that range, which is disposed opposite the reception for the snap fastener closing half, on the one hand, and the securing ring, on the other hand, on the inner side of the plate, in order to obtain a holding of the injection molding material in case of its known shrinking.

Finally, it is advisable for the finding of markings on carriers, on which the connection is produced, to provide passages or break throughs in the center of the reception for the securing ring, on the one hand, in the one plate and for the snap fastener closing halves, on the other hand, in the other plate, if the device is moved in its folded state beyond the edge of the carrier.

With these and other objects in view, which will become apparent in the following detailed description, the present invention, which is shown by example only, will be clearly understood in connection with the accompanying drawing, in which:

FIG. 1 is a top plan view of the inside of the completely flattened device in accordance with the present invention;

FIG. 2 is a top plan view of the backside of the device disclosed in FIG. 1;

FIG. 3 is a section of the device disclosed in FIG. 1 along the section lines III—III of FIG. 1;

FIGS. 4 and 5 are perspective showings of the coordinated connecting parts, a securing ring and snap fasteners closing halves, as well as the carrier;

FIG. 6 is a lateral section through the device with inserted parts shortly prior to the connecting process; and FIG. 7 is a side elevation of the device to the end face upon performance of the connection.

Referring now to the drawings, the device 10 comprises two plates 11 and 12, which are connected together by a bridge 13 made of a flexible material. This structure is integral of synthetic material, namely of polypropylene and polyethylene, respectively. The one plate 11 has at the free ends a receiver 14 for holding a securing ring 16, while the other plate has at the opposite end of the device a combined receiver 15 for receiving of snap fasteners closing halves, namely, selectively of a snap fastener patrix 17 or of a snap fastener matrix 18. These receivers 14 and 15 are characterized at first by a continuous increase of the plate thickness. Furthermore concentrically with the receivers 14 and 15, a massive ring 19 and 20 is formed onto the plate.

The device serves the connection of snap fastener closing halves 17 and 18 over a securing ring 16 having bendable prongs 21, on carriers 22. The parts coordinated towards each other in case of a connection can be recognized from FIGS. 4 and 5. While on the one side of the carrier 22 the securing ring 16 is provided, which is aligned with its bended prongs 21, against the carrier 22 and is capable of penetrating through the latter on the opposite side of the carrier 22, the closure halves 17 and 18, which are aligned with their snap fastener flange 23 on the carrier. The snap fastener halves 17 and 18 are disposed oppositely of each other with their patrix shaped and matrix shaped, respectively, top faces 24. For the exact arrangement and alignment the device in accordance with the present invention takes care. The material bridge of the device 10 is seen in its profile, as shown in FIG. 3, of U-shape. The arms 25 and 26 extend obtuse-angularly on the inner face 27 of the device 10, on which also the receivers 14 and 15 are provided. This is clearly to be recognized in the dotted dashed-lines 25' and 26' in FIG. 3. The actual bending zone of the material bridge 13 is arranged in the top 28 of the U-profile. At this point the working material is thinned and makes possible the hinge-like effect of the material bridge. This makes it possible to move the two plates 11 and 12 from its stretched position in accordance with FIG. 1 to 3 to a closed folded position in accordance with FIG. 7. An intermediate step from this collapsing movement can be recognized from FIG. 6.

The receivers 14 and 15 for the individual connecting part are arranged as follows:

The receiver 15 for the snap fastener closure halves comprises an annular collar 30, which is formed by a correspondingly weak formation form elastically and surrounds the edge of the flange 23 in a narrow passage. Between the collar 30 and the massive ring 20 surrounding the former is arranged concentrically an annular slot 31. In the center is arranged the the receiver with its recess 32, which serves two functions. The first function results in the fact that it receives the top faces 24 of the closure halves, because they are lowered with their faces downwardly into the receiver 15, as can be ascertained from FIG. 6. The recess 32 passes through up to the outside 33 of the device 10 whereby in case of a matrix half 18, it has a central breakthrough which shows as top faces 24, the possibility exists to sight a marker on the carrier 22, which determines that point, on which the snap fastener closure half is to be secured to the carrier 22. On the outside 33 of the device there is provided within the range of the receiver an annular provision of recesses 34, which in case of shrinking of the injection molding material cause a holding of the receiver 15.

The receiver 14 for the securing ring 16 on the other plate 11 consists at first of a lower portion 35 for the reception of the annular body. In the center of the receiver 14 is disposed a core piece 36, which is formed correspondingly with the inner space of the securing ring 16. This core piece 36 comprises relative to the working material of the device 10 an essentially softer elastic synthetic material. The core piece 36 has a cylindrical configuration with a conically undercut lower edge and which permits the insertion of the core piece 36 into a recess of the plate 11. The core piece 36 is thereby equipped with a center bore 37 which is aligned with a complementary bore 38 in the plate and produces for a portion of plate 11 which is visable therethrough. These bores 37 and 38 serve the purpose, in order to sight in the folded portion a marking on the other side of the carrier 22, so that the snap fastener closure half can be provided at the desired point of the carrier. The core piece is formed with its upper end face shown projecting concerning the adjacent top 40 of the reinforcement 19. It follows from this that the prongs 21 disposed at the inner edge of the ring body 16 surround narrowly with their foot members 41 the periphery of the core member 36 designed accordingly and thereby take care for a non-loosening holding of the securing ring, which is important for a securing of the securing ring 16, during the folding movement in the direction of the arrow 42 of FIG. 6. The ends 43 of the prongs extend beyond the end face 39 of the core member 36. On the outside 33 of the plate an annular arrangement of recesses 44 is likewise provided between the range of the receiver 14, which take care of a holding for the receiver 14 in case of shrinking of the injection molding material after production of the device 10.

The method of operation of the device is as follows:

In the opened state of the plates of the device 10 in accordance with FIGS. 1 to 3 the individual connecting parts as the snap fasteners closure halves 17 and 18 and the securing ring 16 are inserted into the corresponding receivers 14 and 15. The bridge 13 of working material which is designed form-elastically, takes care, as a tension spring, for the stretched position of the plates. Thereafter the two plates 11 and 12 are moved towards each other, as shown in FIG. 6, and the carrier 22 is disposed between the two parts to be connected, the edge of the carrier 22 suitably bent over for the formation of a seam. This bent over state is secured by the connection. Thereafter, the two plates 11, 12 are moved towards each other, whereby the bridge of working material by its U-profile takes care that in the end state the two plates are disposed parallel over each other and thereby the prongs 21 of the securing ring arrive in axial direction towards the snap fastener closure halves into the corresponding reception spaces. The prongs 21 pierce the carrier 22 with their freely lying ends 43. Thereafter a force is exerted between the two plates by means of an impact tool such as a hammer 45, as it is shown symbolically in FIG. 7. The core member 36 projecting over the top of the ring reinforcement 19 is thereby set off, whereby the rolling movement of the prong ends in the reception spaces of the complementary snap fastener closure halves is favored. Thereby the snap fastener closure half is secured on the carrier 22 over a securing ring. If the device is released, the two plates 11 and 12 move away from each other under the effect of the elastic bridge 13 and free the part connected together. Thereafter the device can be used for the connection of the complementary other snap fastener closure half with the complementary top faces.

The device 10 serves also the securing of the parts to be connected in an aligned position towards each other and secures an arrangement on the desired location of the connection marker, which is visible in the center of the receivers 14 and 15. Since during the application process in accordance with FIG. 7 the two plates are held or retained by the finger at the edge of the carrier 22 and the engagement of the prong in the reception spaces of the snap fastener closure half takes place by the hammer 45, the device has also the purpose to insecure that the hammer hit does not reach the fingers which hold the device edge in the desired position. The device is also extensively suitable to provide within a private range in a fast manner snap fastener closure at the desired positions of carriers, in particular on clothing pieces.

While I have disclosed one embodiment of the present invention, it is to be understood that this embodiment is given by example only and not in a limiting sense.

I claim:

1. A device for the connection of snap fastener closure havles, as a snap fastener matrix or a snap fastener partrix by a securing ring having flexible prongs, by means of a hitting tool on a carrier,
    said carrier comprising two plates having receiver means for said snap fastener closure halves and for said securing ring,
    hinge means integrally connecting said two plates for folding said plates in aligned parallel position towards each other with said respective receiver means aligned and for positioning said plates in a completely folded open out-stretched 180 position of said plates relating to each other, selectively,
    both said plates being integrally formed of synthetic material and connected by said hinge means, the latter constituting a flexible bridge of material,
    said bridge of material defines a U-profile in said completely folded-open out-stretched 180 position of said plates relative to each other,
    said bridge has arm ends sitting on faces of said plates, and a top range of said U-profile of said bridge is of a weakened structure for the formation of a bending zone.

2. The device, as set forth in claim 1, wherein said arm ends of said U-profile of said bridge extend obtuse-angular to the plane of said plates and to an inner face of said plates, which inner face has receiver means.

3. The device, as set forth in claim 1, wherein said receiver means of one of said plates constitutes a single combined receiver for a selective arrangement of one of a snap fastener patrix and of a snap fastener matrix, and is equipped with a holder elastically surrounding an edge of a snap fastener flange,
    said holder comprises an annular collar formed on said one plate, and
    said collar defining a bore in its center for receiving of snap fastener top faces set off from said flange.

4. The device, as set forth in claim 3, wherein said annular collar is surrounded by a massive annular reinforcement and separated by an annular slot.

5. The device, as set forth in claim 1, wherein said receiver means of one of said plates is for receiving of said securing ring, and carries a corresponding wide, projecting core member having a projecting end face,
    said core member is surrounded along its periphery by foot portions of said prongs, the ends of said prongs to be bent over project beyond said projecting end face of said core member.

6. The device, as set forth in claim 5, wherein said core member is made of soft-elastic synthetic material,
    said one of said plates has a recess receiving said core member.

7. The device, as set forth in claim 5, wherein said core member has an end face,
    said securing ring is surrounded by a reinforcement means including a top formation, and
    said end face of said core member projects beyond said top formation of said reinforcement means.

8. The device, as set forth in claim 1, wherein annularly arranged recesses are arranged on the outside of both said plates within the range of said receiver means, the latter provided on the inside of said plates.

9. The device, as set forth in claim 1, wherein a recess is formed completely through the center of said receiver means for said securing ring and of said receiver means for said snap fastener closure half, in order to find markers in said carrier.

* * * * *